United States Patent [19]
Kawakami et al.

[11] Patent Number: 6,118,928
[45] Date of Patent: *Sep. 12, 2000

[54] VIDEO SIGNAL COMPRESSION-ENCODING APPARATUS, RECORDING MEDIUM AND VIDEO SIGNAL REPRODUCING APPARATUS

[75] Inventors: Shinichi Kawakami, Moriguchi; Masahiro Honjo, Sakai, both of Japan

[73] Assignee: Matsushita Electric Industrial Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/609,399

[22] Filed: Mar. 1, 1996

[30] Foreign Application Priority Data

Mar. 2, 1995 [JP] Japan ................................. 7-042890

[51] Int. Cl.$^7$ .................................................. H04N 5/917
[52] U.S. Cl. .......................................... 386/109; 386/112
[58] Field of Search ............................... 386/33, 40, 109, 386/111, 112, 124; 360/8; 348/700, 415, 384, 390, 409, 410, 411, 412, 420, 426

[56] References Cited

U.S. PATENT DOCUMENTS

| | | | |
|---|---|---|---|
| 5,140,437 | 8/1992 | Yonemitsu et al. | 358/342 |
| 5,223,949 | 6/1993 | Honjo | 358/426 |
| 5,231,484 | 7/1993 | Gonzales et al. | 348/405 |
| 5,293,229 | 3/1994 | Iu | 348/415 |
| 5,305,113 | 4/1994 | Iwamura et al. | 386/111 |
| 5,319,468 | 6/1994 | Honjo | 348/415 |
| 5,455,684 | 10/1995 | Fujinami et al. | 358/335 |
| 5,479,209 | 12/1995 | Miyazaki | 348/426 |
| 5,510,844 | 4/1996 | Cash et al. | 348/426 |
| 5,532,746 | 7/1996 | Chang | 348/700 |
| 5,537,409 | 7/1996 | Moriyama et al. | 348/423 |
| 5,543,846 | 8/1996 | Yagasaki | 348/415 |
| 5,568,274 | 10/1996 | Fujinami et al. | 386/107 |
| 5,592,226 | 1/1997 | Lee et al. | 348/413 |
| 5,594,709 | 1/1997 | Nagano et al. | 369/32 |
| 5,661,523 | 8/1997 | Yamane | 348/415 |
| 5,701,160 | 12/1997 | Kimura et al. | 348/413 |
| 5,787,225 | 7/1998 | Honjo | 386/105 |

FOREIGN PATENT DOCUMENTS

3-253191  11/1991  Japan .

*Primary Examiner*—Wendy Garber
*Assistant Examiner*—Aung S. Moe
*Attorney, Agent, or Firm*—Ratner & Prestia

[57] ABSTRACT

A video signal compression-encoding apparatus for receiving a plurality of successive video signals and subjecting the video signals to intra-frame encoding, forward predictive inter-frame encoding, and bidirectional predictive inter-frame encoding, thereby generating I-pictures, P-pictures, and B-pictures, respectively, is provided. The apparatus includes: an assigned data generator allowing a user to assign a picture to be subjected to the intra-picture encoding among the input pictures and generating assigned data representing the picture assigned by the user; and a group structure generator generating a group structure in such a manner that, in a case where the encoding is performed using a first group structure satisfying N=N1 and M=M1 (N1 and M1: natural numbers), when the picture assigned by the user is not identical with a second I-picture, a picture group having a second group structure different from the first group structure is positioned before the picture assigned by the user, wherein N is a period of each of the I-pictures, M is a period of each of the P-pictures, and the picture group includes a first I-picture among the I-pictures to a picture immediately before a second I-picture, which is the I-picture next to the first I-picture. A recording medium recorded by the apparatus and a video signal reproducing apparatus for reproducing the recording medium are also provided.

19 Claims, 8 Drawing Sheets

It: Area in which a user-assigned I-frame is recorded

$I_1$: Area in which a user-assigned I-frame is recorded

FIG. 5

GOP recorded in the first GOP structure

GOP recorded in the second GOP structure $I_1$: Area in which a user-assigned I-frame is recorded

VIDEO SIGNAL COMPRESSION-ENCODING APPARATUS, RECORDING MEDIUM AND VIDEO SIGNAL REPRODUCING APPARATUS

BACKGROUND OF THE INVENTION

1. Field of the Invention

The present invention relates to a video signal compression-encoding apparatus, a recording medium, and a video signal reproducing apparatus.

2. Description of the Related Art

In recent years, a process for compression-encoding a video signal has been studied along with the advancement of digital storage media. In International Organization for Standardization (ISO), standardization efforts of a method for compression-encoding moving images have been made in Moving Picture Image Coding Experts Group (MPEG) of International Electrotechnical Commission (IEC).

Digitized moving image data contains a great amount of information. Therefore, the digitized moving image data is compression-encoded to a degree that information is not noticeably degraded in an original image.

According to a compression-encoding method, several frames or several fields are placed in one group, and at least one frame or one field is subjected to intra-frame or intra-field compression-encoding processing at a relatively low compression rate and the remaining frames or fields are subjected to inter-frame or inter-field compression-encoding processing at a relatively high compression rate.

The above-mentioned combination of the intra-frame or intra-field compression-encoding processing and the inter-frame or inter-field compression-encoding processing can relatively suppress degradation of an image quality while improving a compression rate. By being subjected to compression-encoding processing, image data can be recorded in and reproduced from a recording medium for a longer period of time.

However, according to the above-mentioned conventional method, an I-frame appears at predetermined intervals (e.g., at intervals of 15 frames). Therefore, the entry point of a scene is found on a group of picture (hereinafter, referred to as a "GOP") basis, but not on a frame basis. This configuration also makes it impossible to place a frame after the change of a scene at a leading edge of a GOP, causing quality degradation of an image decoded and reproduced from a recording medium.

SUMMARY OF THE INVENTION

A video signal compression-encoding apparatus is provided, which receives a plurality of successive video signals and subjects the video signals to intra-frame encoding, forward predictive inter-frame encoding, and bidirectional predictive inter-frame encoding, thereby generating I-pictures, P-pictures, and B-pictures, respectively. The apparatus includes: an assigned data generator allowing a user to assign a picture to be subjected to the intra-picture encoding among the input pictures and generating assigned data representing the picture assigned by the user; and a group structure generator generating a group structure in such a manner that, in a case where the encoding is performed using a first group structure satisfying N=N1 and M=M1 (N1 and M1: natural numbers), when the picture assigned by the user is not identical with a second I-picture, a picture group having a second group structure different from the first group structure is positioned before the picture assigned by the user, wherein N is a period of each of the I-pictures, M is a period of each of the P-pictures, and the picture group includes a first I-picture among the I-pictures to a picture immediately before a second I-picture, which is the I-picture next to the first I-picture.

According to another aspect of the present invention, a recording medium is provided, which is recorded by a video signal compression-encoding apparatus for receiving a plurality of successive video signals and subjecting the video signals to intra-frame encoding, forward predictive inter-frame encoding, and bidirectional predictive inter-frame encoding, thereby generating I-pictures, P-pictures, and B-pictures, respectively. The apparatus includes: an assigned data generator allowing a user to assign a picture to be subjected to the intra-picture encoding among the input pictures and generating assigned data representing the picture assigned by the user; and a group structure generator generating a group structure in such a manner that, in a case where the encoding is performed using a first group structure satisfying N=N1 and M=M1 (N1 and M1: natural numbers), when the picture assigned by the user is not identical with a second I-picture, a picture group having a second group structure different from the first group structure is positioned before the picture assigned by the user, wherein N is a period of each of the I-pictures, M is a period of each of the P-pictures, and the picture group includes a first I-picture among the I-pictures to a picture immediately before a second I-picture, which is the I-picture next to the first I-picture.

According to another aspect of the present invention, a video signal reproducing apparatus is provided, which reproduces a recording medium recorded by a video signal compression-encoding apparatus for receiving a plurality of successive video signals and subjecting the video signals to intra-frame encoding, forward predictive inter-frame encoding, and bidirectional predictive inter-frame encoding, thereby generating I-pictures, P-pictures, and B-pictures, respectively. The apparatus includes: an assigned data generator allowing a user to assign a picture to be subjected to the intrapicture encoding among the input pictures and generating assigned data representing the picture assigned by the user; and a group structure generator generating a group structure in such a manner that, in a case where the encoding is performed using a first group structure satisfying N=N1 and M=M1 (N1 and M1: natural numbers), when the picture assigned by the user is not identical with a second I-picture, a picture group having a second group structure different from the first group structure is positioned before the picture assigned by the user, wherein N is a period of each of the I-pictures, M is a period of each of the P-pictures, and the picture group includes a first I-picture among the I-pictures to a picture immediately before a second I-picture, which is the I-picture next to the first I-picture.

In one embodiment of the present invention, M=3 in the first group structure and M=1 in the second group structure.

In another embodiment of the present invention, M=3 in the first group structure and M=2 in the second group structure.

In another embodiment of the present invention, the picture group having a third group structure is positioned immediately before the picture assigned by the user, the picture group having a fourth group structure is positioned immediately before the picture group having the third group structure, N=N1 and M=3 in the first group structure, N=N2 (N2: natural number) in the third group structure, N=N3 (N3: natural number) in the fourth group structure, and N4=N2+N3 (N2: multiple of 2, N3: multiple of 3), where N4 is the number of pictures from a last picture of the picture group having the first group structure to the picture assigned by the user.

In another embodiment of the present invention, M=2 in the third group structure, and M=3 in the fourth group structure.

In another embodiment of the present invention, M=3 in the third group structure, and M=2 in the fourth group structure.

In another embodiment of the present invention, the picture assigned by the user is an entry point-assigned picture or a picture immediately after change of a scene.

Due to the above-mentioned configuration, a frame desired to be set as a user-assigned I-frame can be freely set. This enables an arbitrary frame to be arranged at a leading edge of a GOP, whereby an entry point can be freely set. Furthermore, a frame after the change of a scene can be set as an I-frame, so that the quality of an image reproduced from a compressed image can be substantially improved.

Thus, the invention described herein makes possible the advantages of (1) providing a video signal compression-encoding apparatus which encodes an arbitrary frame by intra-frame compression-encoding or intra-field compression-encoding so as to enable the entry point of an arbitrary frame to be found and to set a frame after the change of a scene as an I-frame, thereby substantially improving image quality; (2) providing a recording medium in which data compression-encoded by the video signal compression-encoding apparatus is recorded; and (3) providing a video signal reproducing apparatus which reproduces data from the recording medium.

These and other advantages of the present invention will become apparent to those skilled in the art upon reading and understanding the following detailed description with reference to the accompanying figures.

DESCRIPTION OF THE PREFERRED EMBODIMENTS

EXAMPLE 1

Hereinafter, an example of a video signal compression-encoding apparatus according to the present invention will be described with reference to the drawings.

Figure 1:
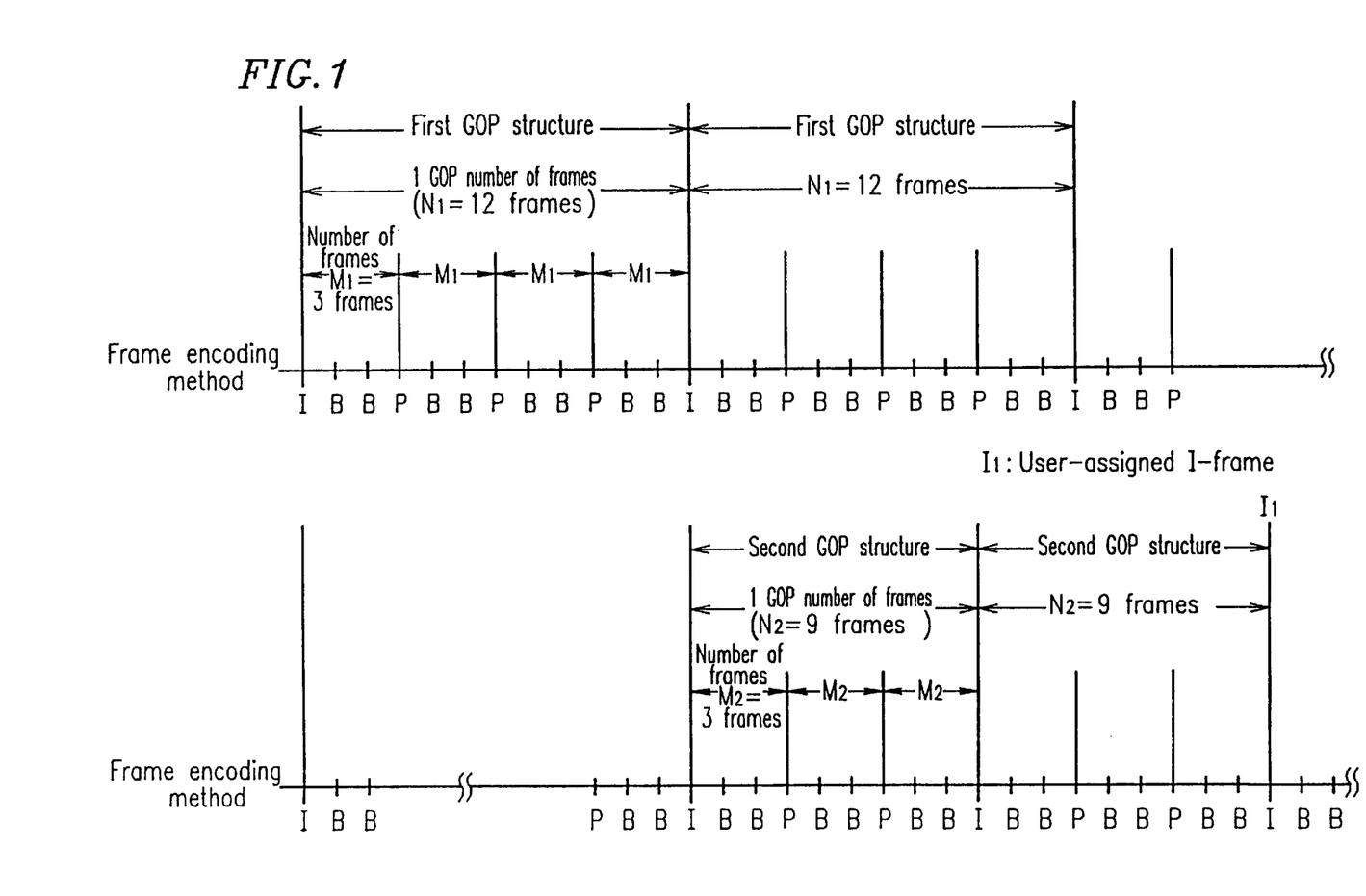
FIG. 1 is a schematic diagram showing the case where two kinds of GOP structures are present in a series of frames.

FIG. 1 is a schematic diagram illustrating a frame encoding method of the video signal compression-encoding apparatus, in which the number of frames in the first GOP (Group Of Pictures) structure is 12 ($N_1=12$), the number of frames M during a frame period of a P-frame appearing at predetermined frame intervals from an I-frame is 3 ($M_1=3$), the number of frames in the second GOP structure is 9 ($N_2=9$), and the number of frames M during a frame period of a P-frame appearing at predetermined frame intervals from an I-frame is 3 ($M_2=3$). In this figure, P-frames and B-frames are arbitrarily arranged, and the marks respectively denote the following:

I: Frame encoded by an intra-frame compression-encoding method.

P: Frame encoded by a forward predictive inter-frame compression-encoding method.

B: Frame encoded by a bidirectional predictive inter-frame compression-encoding method.

In FIG. 1, the abscissa represents time axis and each mark on the abscissa corresponds to a frame to be reproduced. In this specification, the GOP includes a preceding I-frame, a frame immediately before the next I-frame, and frames between the preceding I-frame and the succeeding next I-frame. Hereinafter, when the frame intervals of the P-frames are referred to, I-frames are regarded as P-frames. For example, in the first GOP structure in FIG. 1, the frames are "I, B, B, P, B, B, P, B, B, I, . . . ". In this case, the frame intervals are counted as if the frames were "P, B, B, P, B, B, P, B, B, P, . . .". Therefore the number of frames in a single GOP structure N is a frame period of the I-frames.

In the case where a user-assigned I-frame ($I_1$) is present as shown in FIG. 1, the combination of the first and second GOP structures as described above reduces image degradation and enables an arbitrary frame to be an entry point. Here, the "entry point" is a picture which is assigned (or defined) by a user.

Figure 2:
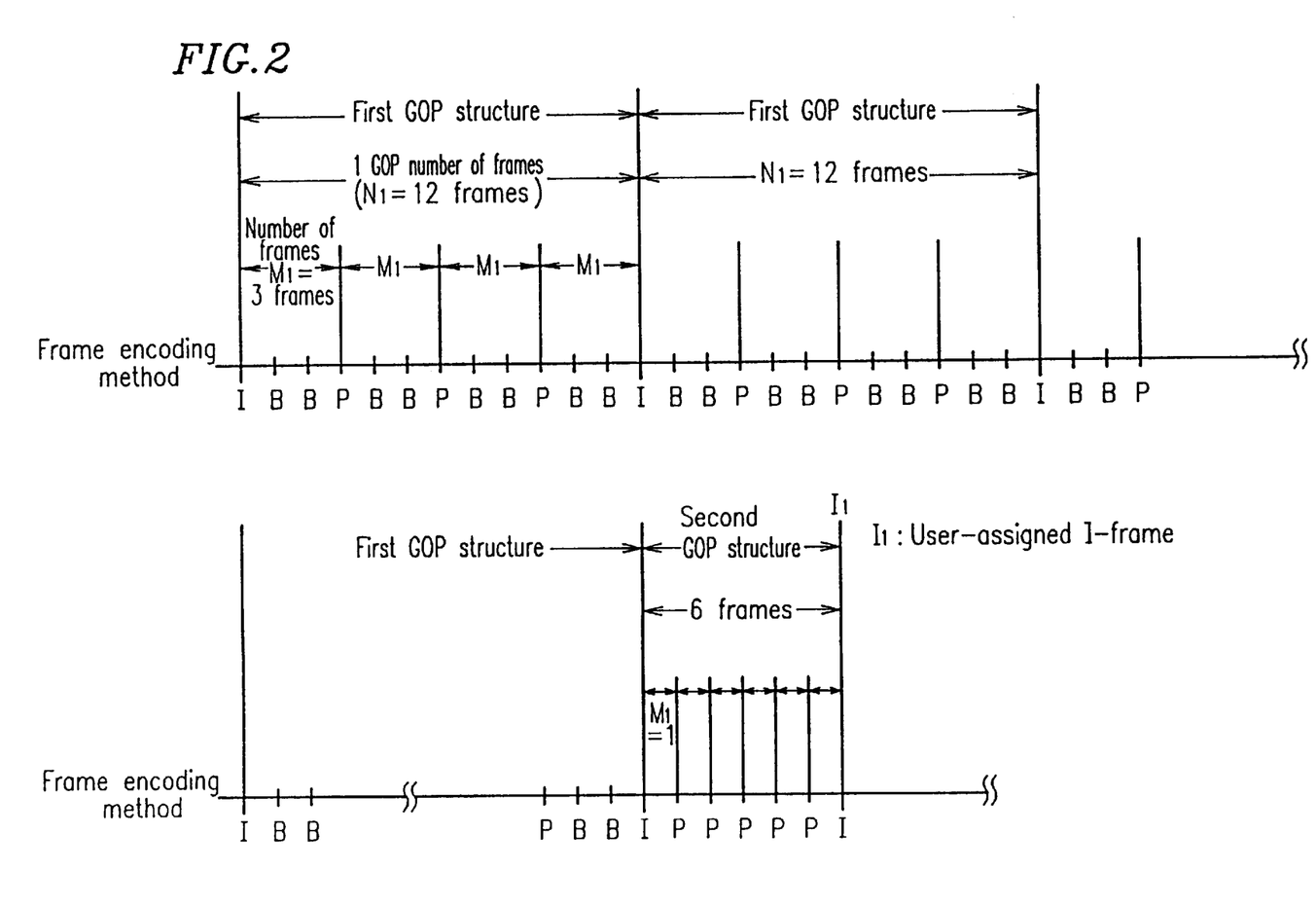
FIG. 2 is a schematic diagram showing the case where two kinds of GOP structures are present in a series of frames.

FIG. 2 is a schematic diagram illustrating a frame encoding method of the video signal compression-encoding apparatus, in which the number of frames in the first GOP structure is 12 ($N_1=12$), the number of frames M during a frame period of a P-frame appearing at predetermined frame intervals from an I-frame is 3 ($M_1=3$), and the second GOP structure only includes I-frames and P-frames.

In this figure, P-frames and B-frames are arbitrarily arranged, and the marks respectively denote the following:

I: Frame encoded by an intra-frame compression-encoding method.

P: Frame encoded by a forward predictive inter-frame compression-encoding method.

B: Frame encoded by a bidirectional predictive inter-frame compression-encoding method.

In the case where a user-assigned I-frame ($I_1$) is present as shown in FIG. 2, the combination of the first and second GOP structures as described above reduces image degradation and enables an arbitrary frame to be an entry point.

Figure 3:
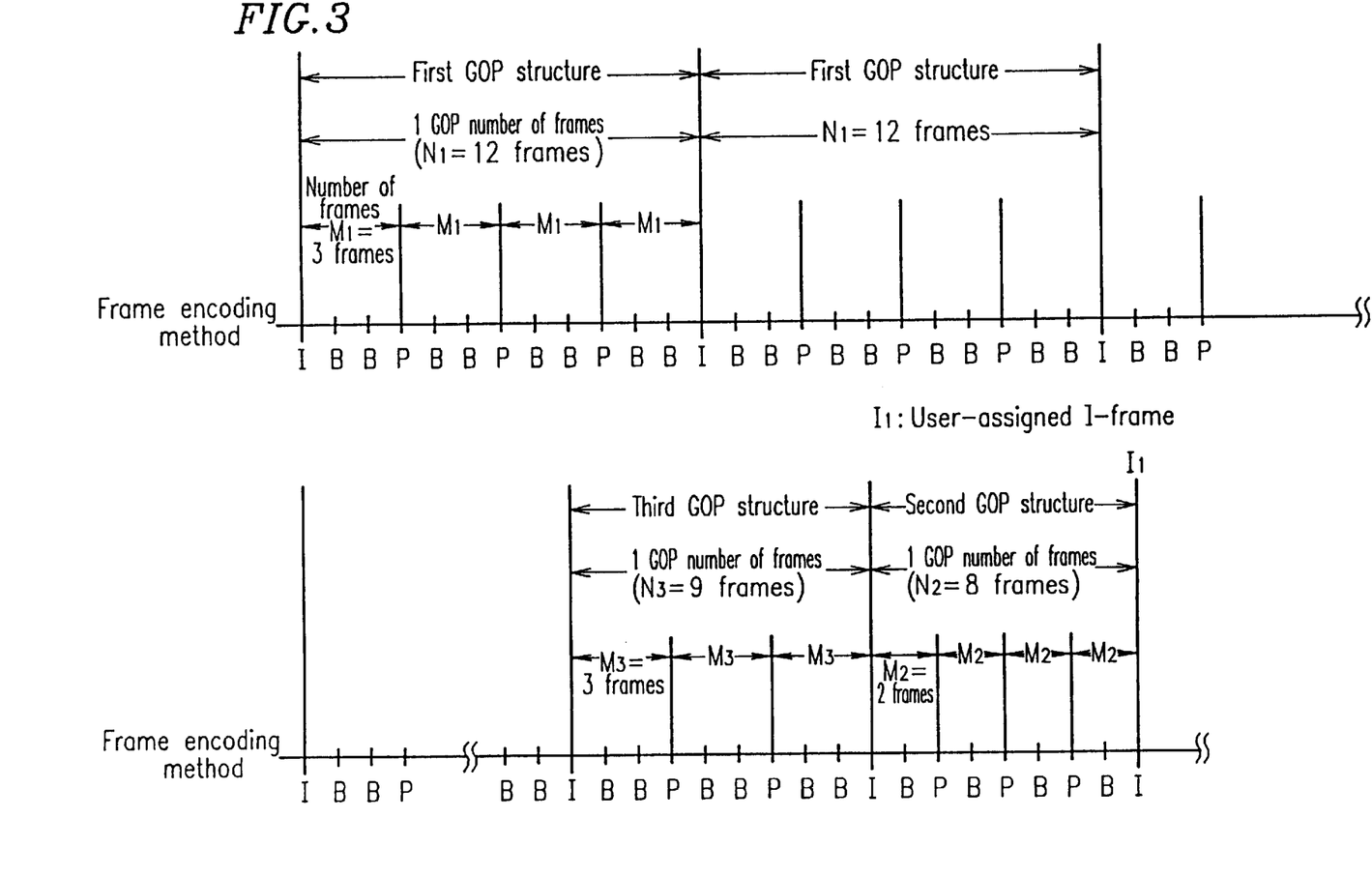
FIG. 3 is a schematic diagram showing the case where three kinds of GOP structures are present in a series of frames.

FIG. 3 is a schematic diagram illustrating a frame encoding method of the video signal compression-encoding apparatus, in which the number of frames in the first GOP structure is 12 ($N_1=12$), the number of frames M during a frame period of a P-frame appearing at predetermined frame intervals from an I-frame is 3 ($M_1=3$), the number of frames in the second GOP structure is 8 ($N_2=8$), the number of frames M during a frame period of a P-frame appearing at predetermined frame intervals from an I-frame is 2 ($M_2=2$), the number of frames in the third GOP structure is 9 ($N_3=9$), and the number of frames M during a frame period of a P-frame appearing at predetermined frame intervals from an I-frame is 3 ($M_3=3$).

In this figure, P-frames and B-frames are arbitrarily arranged, and the marks respectively denote the following:

I: Frame encoded by an intra-frame compression-encoding method.

P: Frame encoded by a forward predictive inter-frame compression-encoding method.

B: Frame encoded by a bidirectional predictive inter-frame compression-encoding method.

In the case where a user-assigned I-frame ($I_1$) is present as shown in FIG. 3, the combination of the first, second, and third GOP structures as described above reduces image degradation and enables an arbitrary frame to be an entry point.

Image processing may be performed on a field basis in place of a frame basis.

Figure 8:
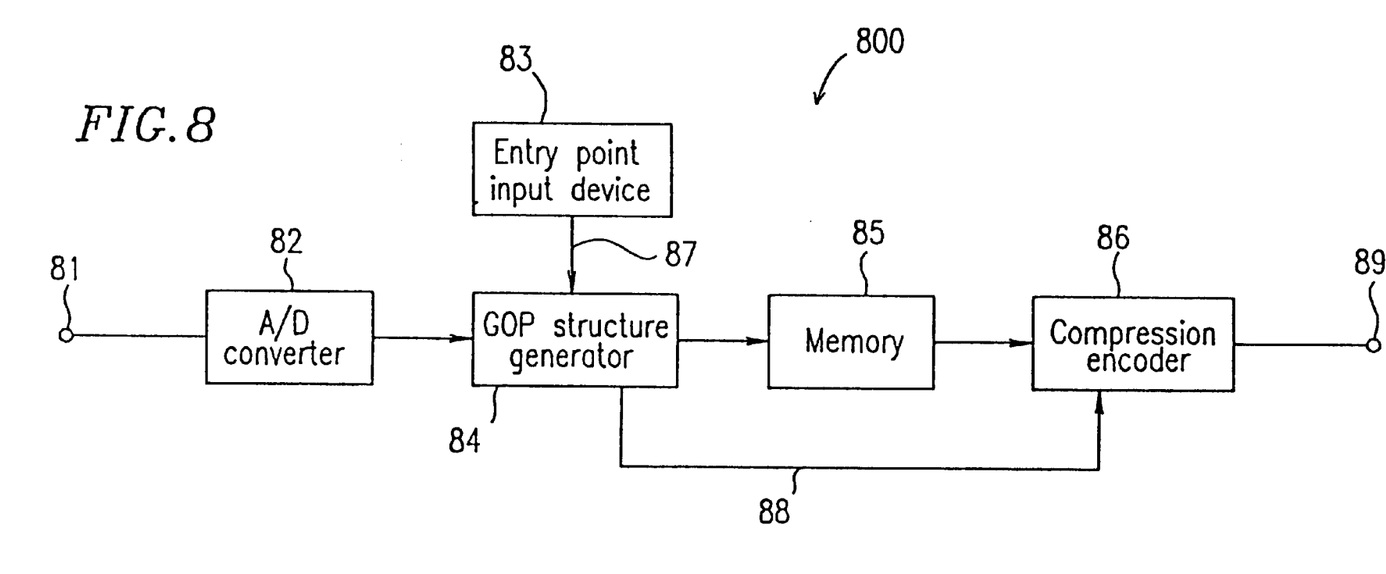
FIG. 8 is a block diagram of the first example of the video signal compression-encoding apparatus according to the present invention.

FIG. 8 is a block diagram of the first example of the video signal compression-encoding apparatus according to the present invention. The operation of the video signal compression-encoding apparatus 800 is described below. An input terminal 81 receives an input analog video signal. An A/D converter 82 receives the input analog video signal and converts the analog signal into a digital video signal carrying data representing a sequence of a plurality of frames. An entry point input device 83 outputs an entry point assign signal 87 representing a position of the user-assigned I-frame (or the entry point) in accordance with input by a user. The entry point assigning signal 87 can be a time code of the user-assigned I-frame. Alternatively, the entry point assign signal 87 can be a frame number of the user-assigned I-frame. The time code and the frame number identify an absolute position in time axis among the sequence of the frames.

A GOP structure generator 84 determines the GOP structure based on the entry point assigning signal 87. Here, the GOP structure defines the frame period of the I-pictures and the frame period of the P-pictures. For example, the GOP structure generator 84 determines the first GOP structure where N=12 and M=3, or the second GOP structure where N=9 and M=3 in accordance with the entry point assign signal 87. The GOP structure generator 84 outputs the digital video signal to a memory 85 and a compression-encoding assign signal 88 to a compression encoder 86. The compression encoding assign signal 88 indicates a compression encoding method among the intra-frame encoding, the forward predictive inter-frame encoding and the bidirectional predictive inter-frame encoding based on the GOP structure defined by the GOP structure generator 84.

The compression encoder 86 receives the digital video signal output from the memory 85 and the compression encoding assign signal 88 output from the GOP structure generator 84. The compression encoder 86 performs one of the compression encoding method among the intra-frame encoding, the forward predictive inter-frame encoding and the bidirectional predictive inter-frame encoding based on the compression encoding assign signal 88, on the digital video signal.

An output terminal 89 outputs the encoded digital data generated by the compression encoder 86. Furthermore, it is possible to implement a video signal recording apparatus by incorporating a recording unit for recording the encoded digital data on a recording medium, such as an optical disk, into the video signal compression-encoding apparatus according to the present invention.

EXAMPLE 2

Hereinafter, an example of a recording medium according to the present invention will be described with reference to the drawings.

Figure 4:
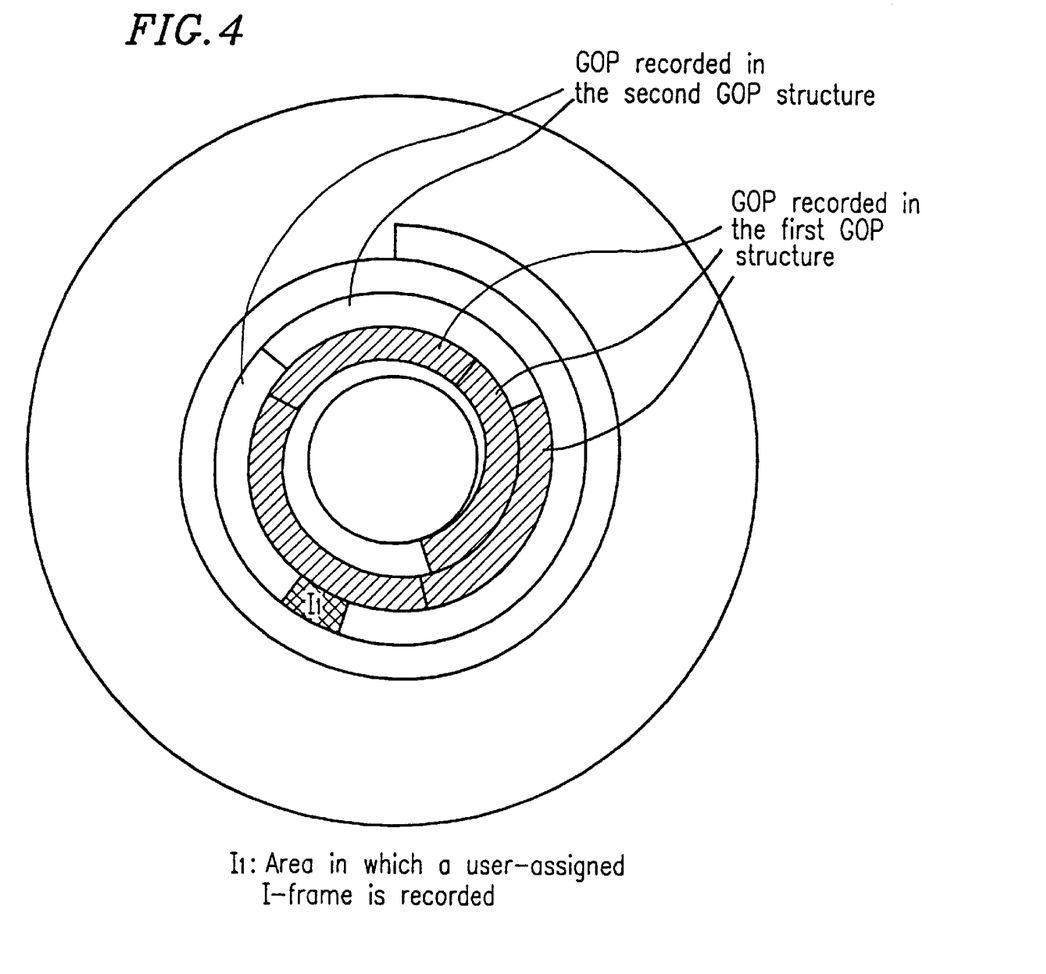
FIG. 4 is a schematic view of a recording medium in which two kinds of GOP structures are present in a series of frames.

FIG. 4 is a schematic view of an optical disk as a recording medium in which the number of frames in the first GOP structure is 12 ($N_1=12$), the number of frames M during a frame period of a P-frame appearing at predetermined frame intervals from an I-frame is 3 ($M_1=3$), the number of frames in the second structure is 9 ($N_2=9$), and the number of frames M during a frame period of a P-frame appearing at predetermined intervals from an I-frame is 3 ($M_2=3$).

In this figure, P-frames and B-frames are arbitrarily arranged, and the marks respectively denote the following:

I: Frame encoded by an intra-frame compression-encoding method.

P: Frame encoded by a forward predictive inter-frame compression-encoding method. B:1 Frame encoded by a bidirectional predictive inter-frame compression-encoding method.

In the case where a user-assigned I-frame (I1) is present as shown in FIG. 4, the combination of the first and second GOP structures as described above reduces image degradation and enables an arbitrary frame to be an entry point.

Figure 5:
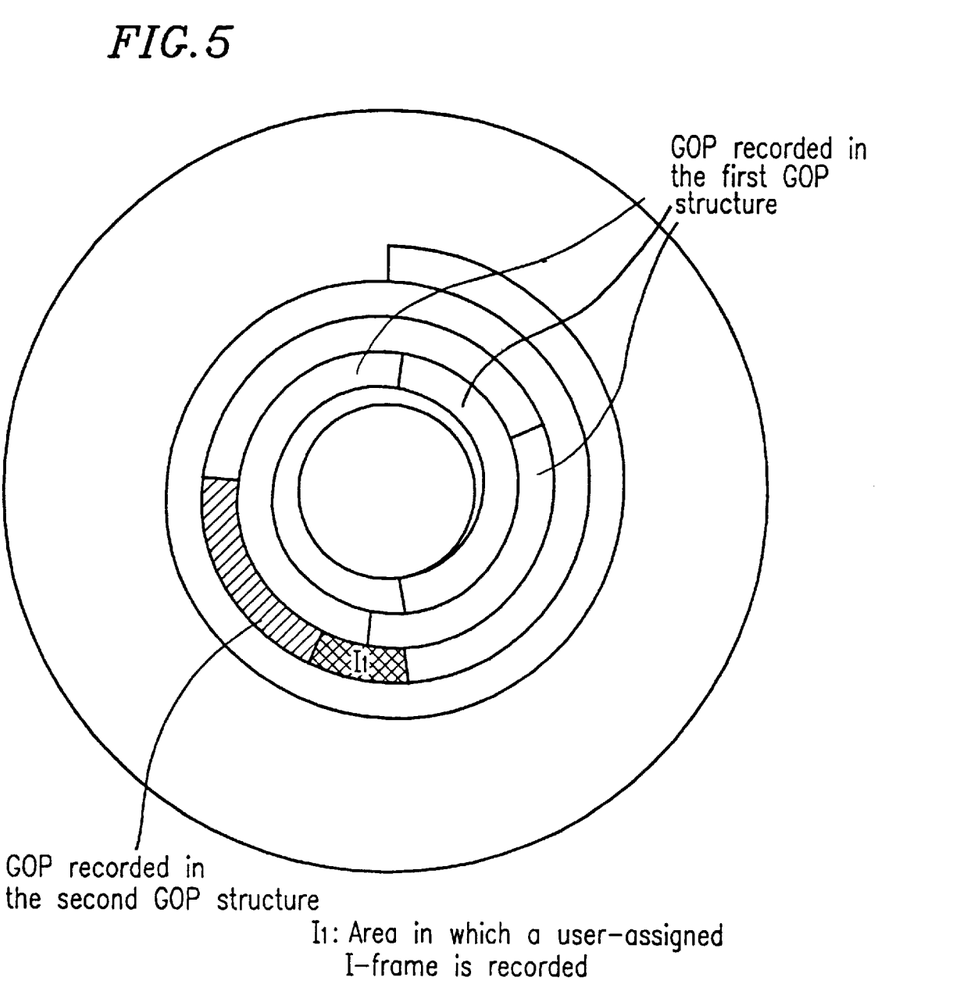
FIG. 5 is a schematic view of a recording medium in which two kinds of GOP structures are present in a series of frames.

FIG. 5 is a schematic view of an optical disk as a recording medium in which the number of frames in the first GOP structure is 12 ($N_1=12$), the number of frames M during a frame period of a P-frame appearing at predetermined frame intervals from an I-frame is 3 ($M_1=3$), and the second GOP structure only includes I-frames and P-frames.

In this figure, P-frames and B-frames are arbitrarily arranged, and the marks respectively denote the following:

I: Frame encoded by an intra-frame compression-encoding method.

P: Frame encoded by a forward predictive inter-frame compression-encoding method.

B: Frame encoded by a bidirectional predictive inter-frame compression-encoding method.

In the case where a user-assigned I-frame (I1) is present as shown in FIG. 5, the combination of the first and second GOP structures as described above reduces image degradation and enables an arbitrary frame to be an entry point.

Figure 6:
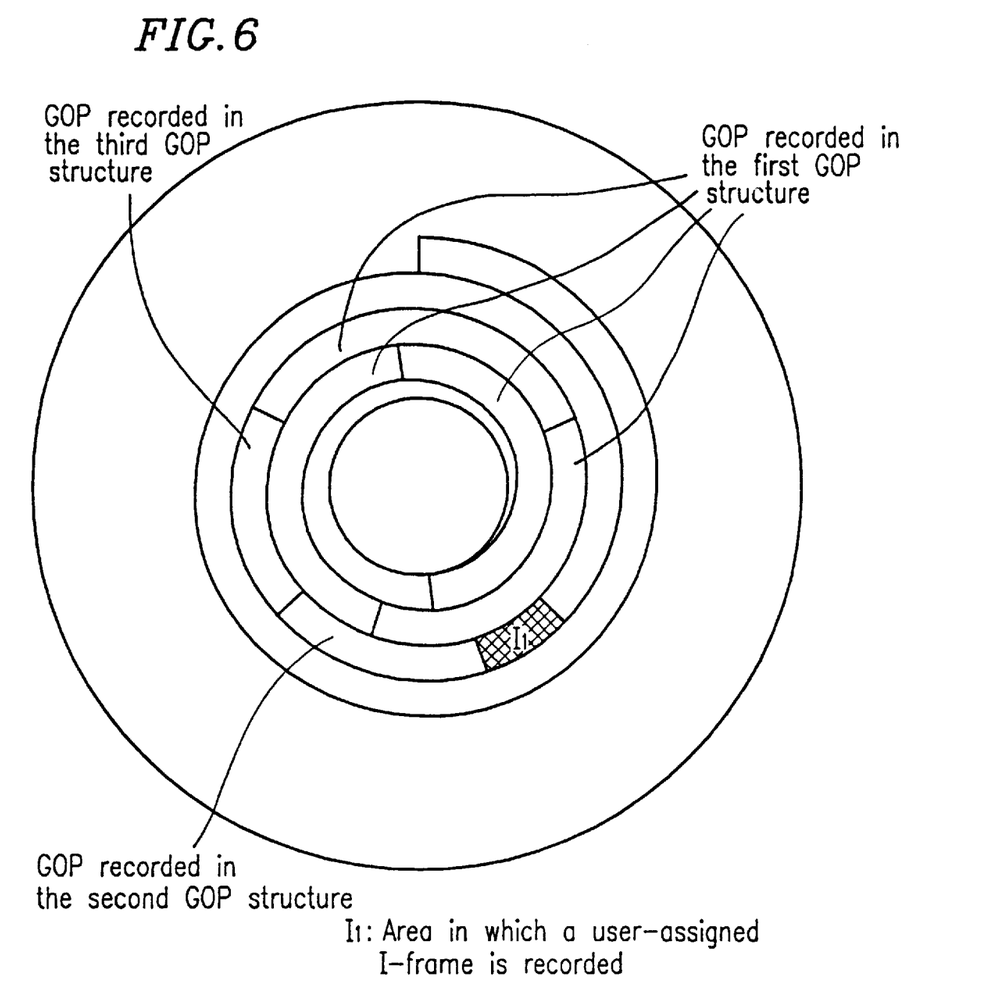
FIG. 6 is a schematic view of a recording medium in which three kinds of GOP structures are present in a series of frames.

FIG. 6 is a schematic view of an optical disk as a recording medium in which the number of frames in the first GOP structure is 12 ($N_1=12$), the number of frames M during a frame period of a P-frame appearing at predetermined frame intervals from an I-frame is 3 ($M_1=3$), the number of frames in the second GOP structure is 8 ($N_2=8$), the number of frames M during a frame period of a P-frame appearing at predetermined frame intervals from an I-frame is 2 ($M_2=2$), the number of frames in the third GOP structure is 9 ($N_3=9$), and the number of frames M during a frame period of a P-frame appearing at predetermined frame intervals from an I-frame is 3 ($M_3=3$).

In this figure, P-frames and B-frames are arbitrarily arranged, and the marks respectively denote the following:

I: Frame encoded by an intra-frame compression-encoding method.

P: Frame encoded by a forward predictive inter-frame compression-encoding method.

B: Frame encoded by a bidirectional predictive inter-frame compression-encoding method.

In the case where a user-assigned I-frame ($I_1$) is present as shown in FIG. 6, the combination of the first, second, and third GOP structures as described above reduces image degradation and enables an arbitrary frame to be an entry point.

Image processing may be performed on a field basis in place of a frame basis.

EXAMPLE 3

Hereinafter, an example of a video signal reproducing apparatus according to the present invention will be described with reference to the drawings.

Figure 7:
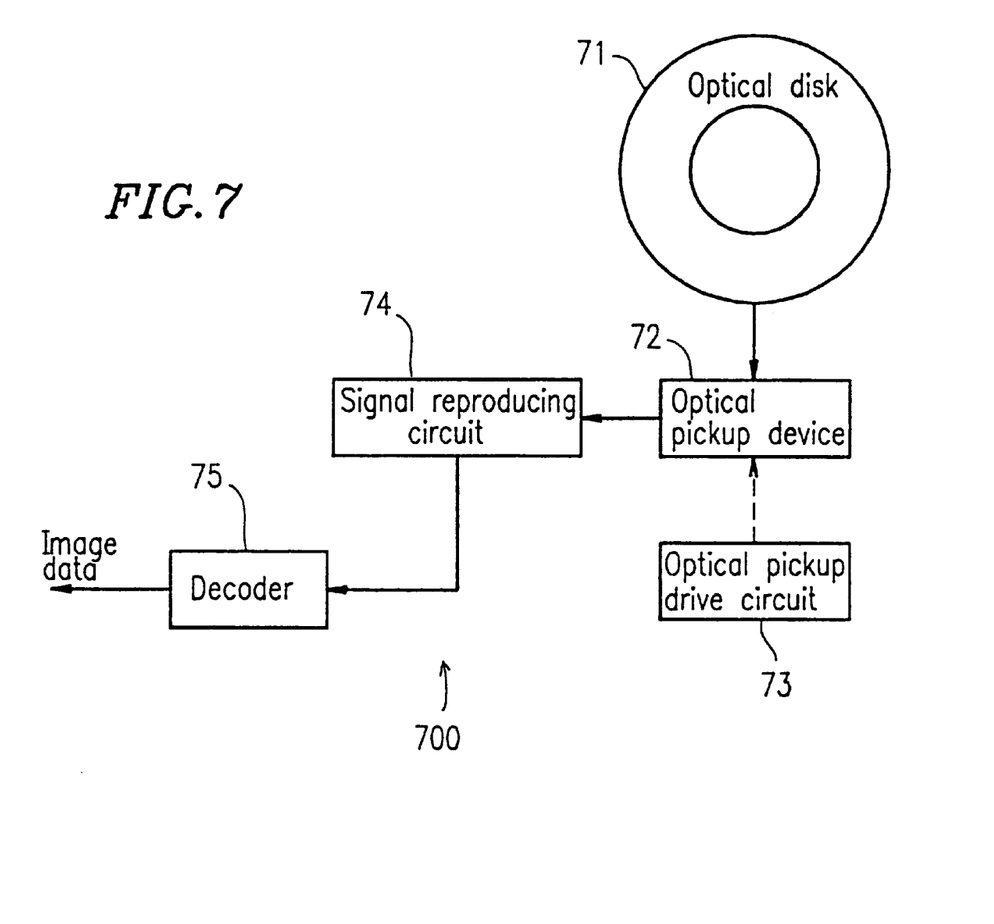
FIG. 7 is a block diagram showing a schematic video signal reproducing apparatus according to the present invention.

FIG. 7 is a block diagram showing a schematic video signal reproducing apparatus 700 according to the present invention. The video signal reproducing apparatus 700 reproduces a compression-encoded video signal recorded in a recording medium such as an optical disk by the above-mentioned video signal compression-encoding apparatus. In the following description, the term "recording medium" is intended to refer to an optical disk. Other kinds of recording media can be used in place of an optical disk. The video signal reproducing apparatus 700 of the present example reproduces information recorded as described in Examples 1 and 2.

The video signal reproducing apparatus 700 includes an optical pickup device 72 fetching a compression-encoded video signal recorded in a recording medium 71, an optical pick-up drive circuit 73 moving the optical pick-up device 72, a signal reproducing circuit 74 receiving a video signal from the optical pick-up device 72 and converting it into a reproduced signal, and a decoder 75 decoding the reproduced signal, thereby outputting image data.

The signal reproducing circuit 74 receives a compression-encoded video signal from the optical pickup device 72 and subjects the video signal to processings such as binaryzation, digital decoding, and error correction. Image data output from the reproducing signal circuit 74 is sent to the decoder 75, which decompresses and decodes the image data so as to output image data to be displayed.

As described above with reference to FIGS. 1 through 3, in the case where an $I_1$-frame is present, which is desired to be a user-assigned I-frame, and the $I_1$-frame does not become an I-frame when the first GOP structure continues, the $I_1$-frame can be set as an I-frame, i.e., a leading edge of a GOP by changing the values N and M in one or two GOP structure immediately before the $I_1$-frame. Thus, the entry point can be found at an arbitrary frame and a frame after the change of a scene can be set as an I-frame, resulting in substantial improvement of image quality.

As described above with reference to FIGS. 4 through 6, in the case where an $I_1$-frame is present, which is desired to be a user-assigned I-frame, and the $I_1$-frame does not become an I-frame when the first GOP structure continues, the $I_1$-frame can be set as an I-frame, i.e., a leading edge of a GOP by changing the values N and M in one or two GOP structure immediately before the $I_1$-frame and recording them in a recording medium. Thus, the entry point can be found at an arbitrary frame and a frame after the change of a scene can be set as an I-frame, resulting in substantial improvement of image quality.

As described above with reference to FIG. 7, in the case where an $I_1$-frame is present, which is desired to be a user-assigned I-frame, and the $I_1$-frame does not become an I-frame when the first GOP structure continues, the $I_1$-frame can be set as an I-frame, i.e., a leading edge of a GOP by changing the values N and M in one or two GOP structure immediately before the $I_1$-frame. Thus, the entry point can be found at an arbitrary frame when data is reproduced from a recording medium in which the $I_1$-frame is set as an I-frame in this manner, and a frame after the change of a scene can be set as an I-frame, resulting in substantial improvement of image quality.

In the above description, a unit of image is a frame, but may be a picture in the MPEG2 standard. The "picture" of MPEG2 corresponds to the frame in the "frame mode" in MPEG2, and to the field in the "field mode" in MPEG2.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A video signal compression-encoding apparatus comprising:

an input device for providing an input identifying an arbitrarily selected picture, in a sequence of pictures, which is to be an I-picture; and a generator for generating a plurality of groups of pictures (GOPs) including at least a first GOP structure having a first arrangement of picture types and at least a second GOP structure having a second arrangement of picture types different from said first arrangement of picture types, wherein the at least one second GOP structure is arranged before the selected picture in accordance with the position of the selected picture, and wherein the generator generates the at least one second GOP structure so that the selected picture becomes an I-picture in the case where the selected picture does not become an I-picture when the first GOP structure continues.

2. A video signal compression-encoding apparatus according to claim 1, wherein a plurality of the second GOP structures are arranged prior to the selected picture.

3. A video signal compression-encoding apparatus according to claim 1, wherein the input is based on a user selected entry point in a video signal including the sequence of pictures.

4. A video signal compression-encoding apparatus according to claim 1, wherein the input is based on a change of scene in a video signal including the sequence of pictures.

5. A video signal compression-encoding apparatus according to claim 1, wherein the plurality of GOPs includes I-pictures, P-pictures and B-pictures, the first GOP structure is defined by $N_1$ and $M_1$ ($N_1$ and $M_1$: natural numbers), the second GOP structure is defined by $N_2$ and $M_2$ ($N_2$ and $M_2$: natural numbers), where $N_1$ is a period of each of the I-pictures for the first GOP structure, $M_1$ is a period of each of the P-pictures for the first GOP structure, $N_2$ is a period of each of the I-pictures for the second GOP structure, $M_2$ is a period of each of the P-pictures for the second GOP structure.

6. A video signal compression-encoding apparatus according to claim 5, wherein $M_1=3$ and $M_2=1$.

7. A video signal compression-encoding apparatus according to claim 5, wherein $M_1=3$ and $M_2=2$.

8. A video signal compression-encoding apparatus according to claim 1, wherein the plurality of GOPs further includes at least one third GOP having a third GOP structure different from the first GOP structure and the second GOP structure, and the at least one third GOP is arranged before the selected picture in accordance with the position of the selected picture.

9. A video signal compression-encoding apparatus according to claim 8, wherein the plurality of GOPs includes I-pictures, P-pictures and B-pictures, the first GOP structure is defined by $N_1$ and $M_1$ ($N_1$ and $M_1$: natural numbers), the second GOP structure is defined by $N_2$ and $M_2$ ($N_2$ and $M_2$: natural numbers), the third GOP structure is defined by $N_3$ and $M_3$ ($N_3$ and $M_3$: natural numbers), where $N_1$ is a period of each of the I-pictures for the first GOP structure, $M_1$ is a period of each of the P-pictures for the first GOP structure, $N_2$ is a period of each of the I-pictures for the second GOP structure, $M_2$ is a period of each of the P-pictures for the second GOP structure, $N_3$ is a period of each of the I-pictures for the third GOP structure, $M_3$ is a period of each of the P-pictures for the third GOP structure.

10. A video signal compression-encoding apparatus according to claim 9, wherein $N_4=N_2+N_3$ ($N_2$: multiple of 2, $N_3$: multiple of 3), where $N_4$ is the number of pictures between a last picture of GOP having the first GOP structure and the selected picture.

11. A video signal compression-encoding apparatus according to claim 10, wherein $M_2=2$ and $M_3=3$.

12. A video signal compression encoding apparatus according to claim 1, wherein said first GOP structure include a forward predictive interframe compression-encoded frame (P-frame).

13. A video signal compression encoding apparatus according to claim 1, wherein said second GOP structure include a forward predictive interframe compression-encoded frame (P-frame).

14. A video signal compression-encoding method comprising the steps of:
   providing an input identifying an arbitrarily selected picture, in a sequence of pictures, which is to be an I-picture; and
   generating a plurality of groups of pictures (GOPs) including at least one first GOP having a first GOP structure and at least one second GOP having a second GOP structure different from the first GOP structure,
   wherein the at least one second GOP structure is arranged before the selected picture in accordance with the position of the selected picture, and
   wherein the generator generates the at least one second GOP structure so that the selected picture becomes an I-picture in the case where the selected picture does not become an I-picture when the first GOP structure continues.

15. A video signal compression-encoding apparatus comprising:
   an input device for providing an input identifying an arbitrary selected frame, in a sequence of frames, which is to be an I-frame; and
   a generator for generating a plurality of groups of pictures (GOPs), the plurality of GOPs including I-frames which are generated by intra-frame encoding, P-frames which are generated by forward predictive inter-frame encoding and B-frames which are generated by bidirectional predictive inter-frame encoding, each of the plurality of GOPs being defined as a group of frames which starts at a first I-frame and ends at a frame immediately before a second I-frame which is an I-frame next to the first I-frame,
   wherein the plurality of GOPs includes at least a first GOP structure having a first arrangement of frame types and at least a second GOP structure having a second arrangement of frame types different from the first arrangement of frame types, at least one second GOP structure is arranged before the selected frame in accordance with the position of the selected frame in such a manner that the selected frame is an I-frame,
   wherein the first GOP structure is defined by $N_1$ and $M_1$ ($N_1$ and $M_1$ are natural numbers, $N_1$ is an integral multiple of $M_1$), the second GOP structure is defined by $N_2$ and $M_2$ ($N_2$ and M2 are natural numbers, N is an integral multiple of $M_2$), where $N_1$ is a period of each of the I-frames for the first GOP structure, $M_1$ is a period of each of the P-frames for the first GOP structure, $N_2$ is a period of each of the I-frames for the second GOP structure, M2 is a period of each of the P-frames for the second GOP structure,
   wherein $N_1 \neq N_2$, $M_1=3$ and $M_2 \neq 3$, and
   wherein the generator generates the at least one second GOP structure so that the selected picture becomes an I-picture in the case where the selected picture does not become an I-picture when the first GOP structure continues.

16. A video signal compression-encoding apparatus according to claim 15, wherein $M_2=1$.

17. A video signal compression-encoding apparatus according to claim 15, wherein $M_2=2$.

18. A video signal compression-encoding apparatus according to claim 15, wherein the input is based on a user selected entry point in a video signal including the sequence of frames.

19. A video signal compression-encoding apparatus according to claim 15, wherein the input is based on a change of scene in a video signal including the sequence of frames.

* * * * *